United States Patent Office 3,299,064
Patented Jan. 17, 1967

3,299,064
CYCLOPENTA[b]PYRIDO[2,3-e]-PYRAZIN DERIVATIVES
Gerhard R. Wendt, Havertown, and Kurt W. Ledig, Philadelphia, Pa., assignors to American Home Products Corporation, New York, N.Y., a corporation of Delaware
No Drawing. Filed Mar. 14, 1966, Ser. No. 533,833
11 Claims. (Cl. 260—250)

This invention relates to new and useful nitrogen containing tricyclic compounds. In particular, it is concerned with cyclopentapyridopyrazines having pharmacodynamic activity.

The novel compounds which are included within the purview of this invention are selected from the groups having the general formula:

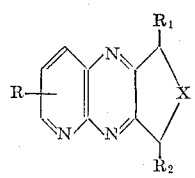

wherein R is selected from the group consisting of hydrogen, chloro, bromo, iodo, carboxy, lower alkoxy and lower alkyl; $R_1$ is selected from the group consisting of hydrogen and carb(lower)alkoxy; $R_2$ is selected from the group consisting of lower alkyl and carb(lower)alkoxy; X is selected from the group consisting of carbonyl, methylidynecarb(lower)alkoxy and methylidynecarboxy; and the pharmaceutically acceptable acid addition salts thereof. Specific examples of such compounds include: 3 - ethyl - 1,3 - dihydro-2H-cyclopenta[b]pyrido[2,3-e]-pyrazin-2-one; 1,3-dihydro-2H-cyclopenta[b]pyrido[2,3-e]-pyrazin-2-one, 1,3-dicarboxylic acid, diethyl ester; and 1,3 - dihydro - 2H - cyclopenta[b]pyrido[2,3-e]pyrazine-1,2,3-tricarboxylic acid, triethyl ester.

The cyclopentapyridopyrazin-2-one compounds of the present invention may be prepared by the interaction of a 2,3-diaminopyridine with a cyclopentane-1,2,4-trione, as exemplified by the following schematic reaction sequence:

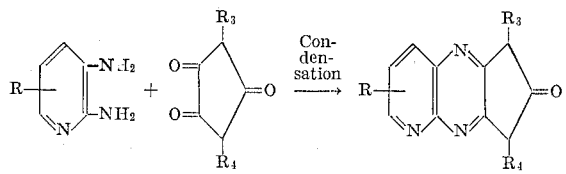

wherein R is defined as above and $R_3$ and $R_4$ are both selected from the group consisting of hydrogen and lower alkyl. The reaction is effected by refluxing a substantially equimolar mixture of the reactants in acetic acid. After the reaction is complete, the reaction mixture is cooled, filtered, washed and dried. Thereafter, the product may be recrystallized from a suitable solvent, such as an alkanol, to obtain a pure crystalline coyclopentapyridopyrazin-2-one product.

The cyclopentapyridopyrazin-2-one, dicarboxylic acid esters and the cyclopentapyridopyrazine-2-carboxylic acids of the present invention may be prepared by the interaction of a 2,3-diaminopyridine with a 2,4,5-trioxo-cyclopentane dicarboxylic acid ester or 1-cyclopentane-3,4-dioxo carboxylic acid, as shown in the following reaction:

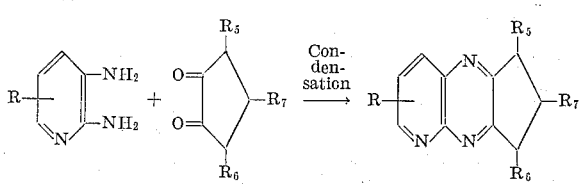

wherein R is defined as above; $R_5$ and $R_6$ are both selected from the group consisting of hydrogen and carb(lower)alkoxy; and $R_7$ is selected from the group consisting of carboxy and oxygen. The reaction is effected by admixing, with stirring at temperatures up to the reflux temperature of the reaction mixture, substantially equimolar amounts of the reactants in dioxane. After the reaction is complete, the resulting precipitated product may be separated by filtration. Thereafter, if desired the free base may be converted to the corresponding hydrochloride salt by admixture thereof, with an isopropanol solution of hydrogen chloride. The hydrochloride salt may then be separated by the addition of ether and then crystallized from an alkanol-ether mixture.

The cyclopentapyridopyrazine, tricarboxylic acid esters of the present invention may be prepared by the interaction of a 2,3-diaminopyridine with a 4,5-dioxo-1,2,3-cyclopentane tricarboxylic acid ester, as represented by the following reaction:

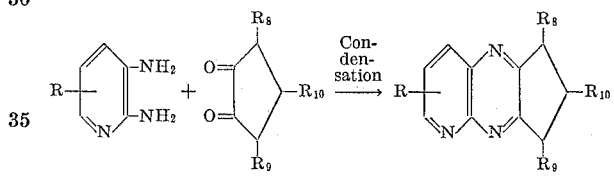

wherein R is defined as above, and $R_8$, $R_9$ and $R_{10}$ are carb(lower)alkoxy. The reaction is conducted by refluxing substantially equimolar amounts of the reactants in an acetic acid-alkanol solvent mixture for about two hours. After the reaction is complete, the solvent is evaporated, the residue dissolved in chloroform and then washed with an alkaline sodium carbonate solution. Thereafter, the chloroform solvent is evaporated and the residue crystallized from ethyl acetate to yield the appropriate cyclopentapyridopyrazine, tricarboxylic acid ester product.

Since the nitrogen containing cyclopentapyridopyrazines of the present invention are basic, advantage may be taken of the water solubility of salts of these compounds formed with acids in the isolation and/or purification of the above compounds and in the preparation of aqueous solutions of these new compounds for oral or parenteral administration. Of course, only salts formed with pharmaceutically acceptable acids should be employed in therapeutic applications. Particularly effective salts are those formed with pharmaceutically acceptable acids having a pH value of 3 or lower. Such acids are well-known in the art, for example, hydrochloric, hydrobromic, hydroiodic, sulfuric, nitric, phosphoric, acetic, lactic, citric, tartaric, maleic, gluconic, benzenesulfonic, toluenesulfonic, methylsulfonic, ethylsulfonic acids and the like. These salts may be prepared by procedures commonly employed in the art, for example, reacting the compound with an equivalent of the selected acid in aqueous solution and concentration of the solution. Other known procedures may also be employed.

Many of the reactants employed in the above described processes are known compounds which are readily available from commercial sources. Others which are not commercially available can easily be prepared in accordance with standard organic procedures well known to those skilled in the art.

In accord with the present invention, the new cyclopentapyridopyrazines herein described have been found to possess interesting pharmaceutical properties which render them useful as synthetic medicinals. More particularly, these compounds, in standard pharmacological tests, have exhibited utility as anti-inflammatory and analgesic agents.

When the compounds of this invention are employed as anti-inflammatory and analgesic agents they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 20 mg. to about 1000 mg. per day, although as aforementioned variations will occur. However, a dosage level that is in the range of from about 50 mg. to about 700 mg. per day is most desirably employed in order to achieve effective results.

The following examples are given by way of illustration and are not to be construed as limitations of this invention, many variations of which are possible without departing from the scope and spirit thereof.

EXAMPLE I

To a solution of 2.7 g. of 2,4,5-trioxo-1,3-cyclopentane dicarboxylic acid, diethyl ester in 50 ml. of dioxane, there is added with stirring, at room temperature, a solution of 1.1 g. of 2,3-diamino-pyridine in 25 ml. of dioxane. The resulting precipitate is 1,3-dihydro-2H-cyclopenta[b]pyrido[2,3-e]-pyrazin-2-one, 1,3-dicarboxylic acid, diethyl ester which is then dissolved in 25 ml. of 5.5 N hydrogen chloride in isopropanol. Addition of ether produces a precipitate which is purified with methanol-ether, yielding 500 mg. of 1,3-dihydro-2H-cyclopenta[b]pyrido[2,3-e]-pyrazin-2-one, 1,3-dicarboxylic acid, diethyl ester, hemihydrochloride, M.P. >300° C.

Analysis for $C_{16}H_{15}N_3O_5 \cdot \frac{1}{2}HCl$, calcd.: C, 55.30; H, 4.40; N, 12.09; Cl, 5.11%. Found: C, 55.20; H, 4.44; N, 12.16; Cl, 5.7.

In a similar manner, 2,4,5-trioxo-1,3-cyclopentane dicarboxylic acid, dimethyl ester is reacted with 2,3-diamino-5-chloropyridine to obtain 7-chloro-1,3-dihydro-2H-cyclopenta[b]pyrido[2,3-e]-pyrazin-2-one, 1,3-dicarboxylic acid, dimethyl ester.

EXAMPLE II

To a solution of 5.4 g. of 2,4,5-trioxo-1,3-cyclopentane dicarboxylic acid, diethyl ester in 100 ml. of dioxane, there is added with stirring a solution of 2.0 g. of 2,3-diamino-4-methyl-pyridine in 25 ml. of dioxane which is refluxed for six hours. The resulting precipitate is 1,3-dihydro - 8-methyl - 2H-cyclopenta[b]pyrido[2,3-e]-pyrazin-2-one, 1,3-dicarboxylic acid, diethyl ester which is separated by filtration.

Similarly, the following compounds are prepared:

7-ethyl - 1,3-dihydro - 2H-cyclopenta[b]pyrido[2,3-e]-pyrazin-2-one, 1,3-dicarboxylic acid, dipropyl ester;

7-bromo - 1,3-dihydro-2H-cyclopenta[b]pyrido[2,3-e]-pyrazin-2-one, 1,3-dicarboxylic acid, dimethyl ester; and 7-butyl - 1,3-dihydro - 2H-cyclopenta[b]pyrido[2,3-e]-pyrazin-2-one, 1,3-dicarboxylic acid, diethyl ester.

EXAMPLE III

A suspension of 2.2 g. of 2,3-diaminopyridine, 6.3 g. of 4,5-dioxo - 1,2,3-cyclopentane-tricarboxylic acid, triethyl ester, 25 ml. of acetic acid, and 50 ml. of alcohol is refluxed for two hours. Thereafter, the solvent is evaporated, the residue dissolved in chloroform, washed with a 5% sodium carbonate solution and evaporated. The resulting gum is crystallized from ethyl acetate to yield 4.0 g. of 1,3-dihydro - 2H-cyclopenta[b]pyrido[2,3-e]-pyrazine - 1,2,3-tricarboxylic acid, triethyl ester; M.P. 150–153° C.; IR 3.0, 7.8, 6.0μ.

Analysis for $C_{19}H_{21}N_3O_6$, calcd. for N, 10.85%. Found: N, 10.60%.

In a similar manner, reacting 2,3-diamino-5-chloropyridine with 4,5-dioxo - 1,2,3-cyclopentane-tricarboxylic acid, trimethyl ester, there is obtained 7-chloro-1,3-dihydro - 2H-cyclopenta[b]pyrido[2,3-e]-pyrazine - 1,2,3-tricarboxylic acid, trimethyl ester.

EXAMPLE IV

A suspension of 2.0 g. of 2,3-diamino-6-methylpyridine, 6.0 g. of 4,5-dioxo-1,2,3-cyclopentane-tricarboxylic acid, tripropyl ester, 25 ml. of acetic acid, and 50 ml. of alcohol is refluxed for three hours. Thereafter, the solvent is evaporated, the residue dissolved in chloroform, and washed with 5% sodium carbonate solution. The residue obtained on evaporation of the solvent is crystallized from ethyl acetate to yield 1,3-dihydro - 6-methyl - 2H-cyclopenta[b]pyrido[2,3-e]-pyrazine - 1,2,3-tricarboxylic acid, tripropyl ester.

Repeating the above procedure, starting with 2,3-diamino - 5-iodopyridine and 4,5-dioxo-1,2,3-cyclopentane-tricarboxylic acid, trimethyl ester, there is obtained 1,3-dihydro - 7 - iodo-2H-cyclopenta[b]pyrido[2,3-e]-pyrazine-1,2,3-tricarboxylic acid, trimethyl ester.

EXAMPLE V

A suspension of 3.0 g. of 3-ethylcyclopentane-1,2,4-trione, 2.2 g. of 2,3-diaminopyridine, and 50 ml. of acetic acid is refluxed for one and a half hours. The reaction mixture is cooled, the precipitate filtered and recrystallized from methanol twice to yield 3-ethyl-1,3-dihydro-2H - cyclopenta[b]pyrido[2,3-e] - pyrazin - 2 - one; M.P. 256-260° C.

Analysis for $C_{12}H_{11}N_3O$, calcd.: C, 67.59; H, 5.20; N, 19.71%. Found: C, 67.89; H, 5.29; N, 19.21.

EXAMPLE VI

Employing the procedure of Example V to react the following diaminopyridines and cyclopentanetriones, the hereinafter 1,3-dihydro-2H-cyclopenta[b]pyrido[2,3-e]-pyrazin-2-ones are obtained:

| Reactants | Products |
|---|---|
| 3-ethylcyclopentane-1,2,4-trione and 2,3-diamino-5-bromopyridine. | 7-bromo-3-ethyl-1,3-dihydro-2H-cyclopenta[b]pyrido[2,3-e]-pyrazin-2-one. |
| 3-methylcyclopentane-1,2,4-trione and 2,3-diaminopyridine. | 1,3-dihydro-3-methyl-2H-cyclopenta[b]pyrido[2,3-e]pyrazin-2-one. |
| 3-propylcyclopentane-1,2,4-trione and 2,3-diamino-5-methylpyridine. | 1,3-dihydro-7-methyl-3-propyl-2H-cyclopenta[b]pyrido[2,3-e]-pyrazin-2-one. |
| 3-methylcyclopentane-1,2,4-trione and 2,3-diamino-5-methylpyridine. | 1,3-dihydro-3,7-dimethyl-2H-cyclopenta[b]pyrido[2,3-e]-pyrazin-2-one. |
| 3-methylcyclopentane-1,2,4-trione and 5,6-diamino-3-pyridine carboxylic acid. | 1,3-dihydro-3-methyl-2H-cyclopenta[b]pyrido[2,3-e]-pyrazin-2-one, 7-carboxylic acid. |

EXAMPLE VII

A suspension of 6.0 g. of 3-methylcyclopentane-1,2,4-trione, 4.5 g. of 2,3-diaminopyridine, and 100 ml. of acetic acid is refluxed for two hours. The reaction mixture is then cooled, the precipitate filtered and recrystallized twice from ethanol to yield 1,3-dihydro-3-methyl-2H-cyclopenta[b]pyrido[2,3-e]-pyrazin-2-one.

EXAMPLE VIII

A suspension of 1.1 g. of 2,3-diaminopyridine and 1.4 g. of 3,4-dioxo-1-cyclopentane carboxylic acid in 125 ml. of dioxane are refluxed for two hours. Thereafter, the reaction mixture is cooled and the resulting precipitate filtered to yield 1.5 g. of 1,3-dihydro-2H-cyclopenta[b]pyrido[2,3-e]-pyrazine-2-carboxylic acid, M.P. 194° C. (dec.).

Analysis for $C_{11}H_9N_3O_2$, calcd.: C, 61.39; H, 4.22; N, 19.28%. Found: C, 61.01; H, 4.27; N, 19.53.

Employing the above procedure, the following compounds are obtained:

7-bromo-1,3-dihydro-2H-cyclopenta[b]pyrido[2,3-e]-pyrazine-2-carboxylic acid;

1,3-dihydro-7-methoxy-2H-cyclopenta[b]pyrido[2,3-e]-pyrazine-2-carboxylic acid; and 1,3-dihydro-7-propoxy-2H-cyclopenta[b]pyrido[2,3-e]-pyrazine-2-carboxylic acid.

EXAMPLE IX

The hydrochloride salt of 7-chloro-1,3-dihydro-2H-cyclopenta[b]pyrido[2,3-e]-pyrazin-2-one, 1,3-dicarboxylic acid, dimethyl ester is prepared by admixing a methanolic solution of this compound with an aqueous solution containing an excess of hydrochloric acid and, thereafter, evaporating the solvent under vacuum.

Other acid addition salts of the new cyclopentapyridopyrazines of the present invention described in the above examples are prepared by the same procedure employing hydrobromic acid, sulfuric acid, phosphoric acid, acetic acid, tartaric acid, maleic acid and gluconic acid.

What is claimed is:

1. A compound selected from the group consisting of those having the formula:

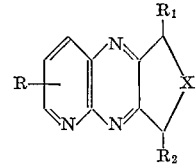

wherein R is selected from the group consisting of hydrogen, chloro, bromo, iodo, carboxy, lower alkoxy and lower alkyl; $R_1$ is selected from the group consisting of hydrogen and carb(lower)alkoxy; $R_2$ is selected from the group consisting of lower alkyl and carb(lower)alkoxy; X is selected from the group consisting of carbonyl, methylidynecarb(lower)alkoxy and methylidynecarboxy; and the pharmaceutically acceptable acid addition salts thereof.

2. A compound as described in claim 1 which is: 3-ethyl-1,3-dihydro-2H-cyclopenta[b]pyrido[2,3-e]-pyrazin-2-one.

3. A compound as described in claim 1 which is: 1,3-dihydro-2H-cyclopenta[b]pyrido[2,3-e]-pyrazin-2-one, 1,3-dicarboxylic acid, diethyl ester.

4. A compound as described in claim 1 which is: 1,3-dihydro-2H-cyclopenta[b]pyrido[2,3-e]-pyrazine-1,2,3-tricarboxylic acid, triethyl ester.

5. A compound as described in claim 1 which is: 7-chloro-1,3-dihydro-2H-cyclopenta[b]pyrido[2,3-e]-pyrazin-2-one, 1,3-dicarboxylic acid, dimethyl ester.

6. A compound as described in claim 1 which is: 1,3-dihydro-8-methyl-2H-cyclopenta[b]pyrido[2,3-e]-pyrazin-2-one, 1,3-dicarboxylic acid, diethyl ester.

7. A compound as described in claim 1 which is: 7-chloro-1,3-dihydro-2H-cyclopenta[b]pyrido[2,3-e]-pyrazine-1,2,3-tricarboxylic acid, trimethyl ester.

8. A compound as described in claim 1 which is: 1,3-dihydro-6-methyl-2H-cyclopenta[b]pyrido[2,3-e]-pyrazine-1,2,3-tricarboxylic acid, tripropyl ester.

9. A compound as described in claim 1 which is: 7-bromo-3-ethyl-1,3-dihydro-2H-cyclopenta[b]pyrido[2,3-e]-pyrazin-2-one.

10. A compound as described in claim 1 which is: 1,3-dihydro-3-methyl-2H-cyclopenta[b]pyrido[2,3-e]-pyrazin-2-one.

11. A compound as described in claim 1 which is: 1,3-dihydro-2H-cyclopenta[b]pyrido[2,3-e]-pyrazine-2-carboxylic acid.

No references cited.

NICHOLAS S. RIZZO, *Primary Examiner.*